United States Patent
Rattunde

(10) Patent No.: US 8,614,796 B2
(45) Date of Patent: Dec. 24, 2013

(54) MEASURING STATION FOR HIGH-GLOSS SURFACES

(75) Inventor: Ulrich Rattunde, Bentwisch (DE)

(73) Assignee: Rattunde & Co GmbH, Ludwigslust (DE)

( * ) Notice: Subject to any disclaimer, the term of this patent is extended or adjusted under 35 U.S.C. 154(b) by 408 days.

(21) Appl. No.: 12/918,162

(22) PCT Filed: Feb. 16, 2009

(86) PCT No.: PCT/DE2009/000210
§ 371 (c)(1),
(2), (4) Date: Feb. 14, 2011

(87) PCT Pub. No.: WO2009/103272
PCT Pub. Date: Aug. 27, 2009

(65) Prior Publication Data
US 2011/0199619 A1    Aug. 18, 2011

(30) Foreign Application Priority Data
Feb. 18, 2008   (DE) .................... 10 2008 009 757

(51) Int. Cl.
*G01B 11/30* (2006.01)
(52) U.S. Cl.
USPC .......... 356/612; 356/601; 356/399; 250/461.1
(58) Field of Classification Search
USPC ................... 356/601–612, 237.1–237.6, 399; 382/100
See application file for complete search history.

(56) References Cited

U.S. PATENT DOCUMENTS

| | | | |
|---|---|---|---|
| 7,453,560 B2 * | 11/2008 | Miyake | 356/237.2 |
| 8,170,172 B2 * | 5/2012 | Uhland | 376/156 |
| 2009/0153877 A1 * | 6/2009 | Grosskurth et al. | 356/601 |
| 2010/0046689 A1 * | 2/2010 | Uhland | 376/151 |

FOREIGN PATENT DOCUMENTS

| | | |
|---|---|---|
| DE | 101 08 221 A1 | 9/2002 |
| DE | 10 2004 025490 A1 | 12/2005 |
| DE | 10 2005 043223 A1 | 3/2007 |
| DE | 10 2005 054373 A1 | 5/2007 |
| WO | WO01/73431 A3 | 10/2001 |
| WO | WO 2007/056974 A1 | 5/2007 |
| WO | WO2007/056974 A1 | 5/2007 |

* cited by examiner

*Primary Examiner* — Roy M Punnoose
*Assistant Examiner* — Isiaka Akanbi
(74) *Attorney, Agent, or Firm* — Varnum, Riddering, Schmidt & Howlett LLP

(57) ABSTRACT

A method is disclosed for measuring a profile of a reflecting face of an end (2) of a pipe section. An electrical field is generated between the face and suspended particles (19) in the ambient air of the face. The particles (19) are attracted to the face by the electrical field and matt-finishing the face. The face is then sensed with a laser beam (16) and scattered light (17) is reflected by the face and measured by a sensor (11), thereby determining a face profile.

11 Claims, 2 Drawing Sheets

MEASURING STATION FOR HIGH-GLOSS SURFACES

CROSS REFERENCE TO RELATED APPLICATIONS

Figure 1:
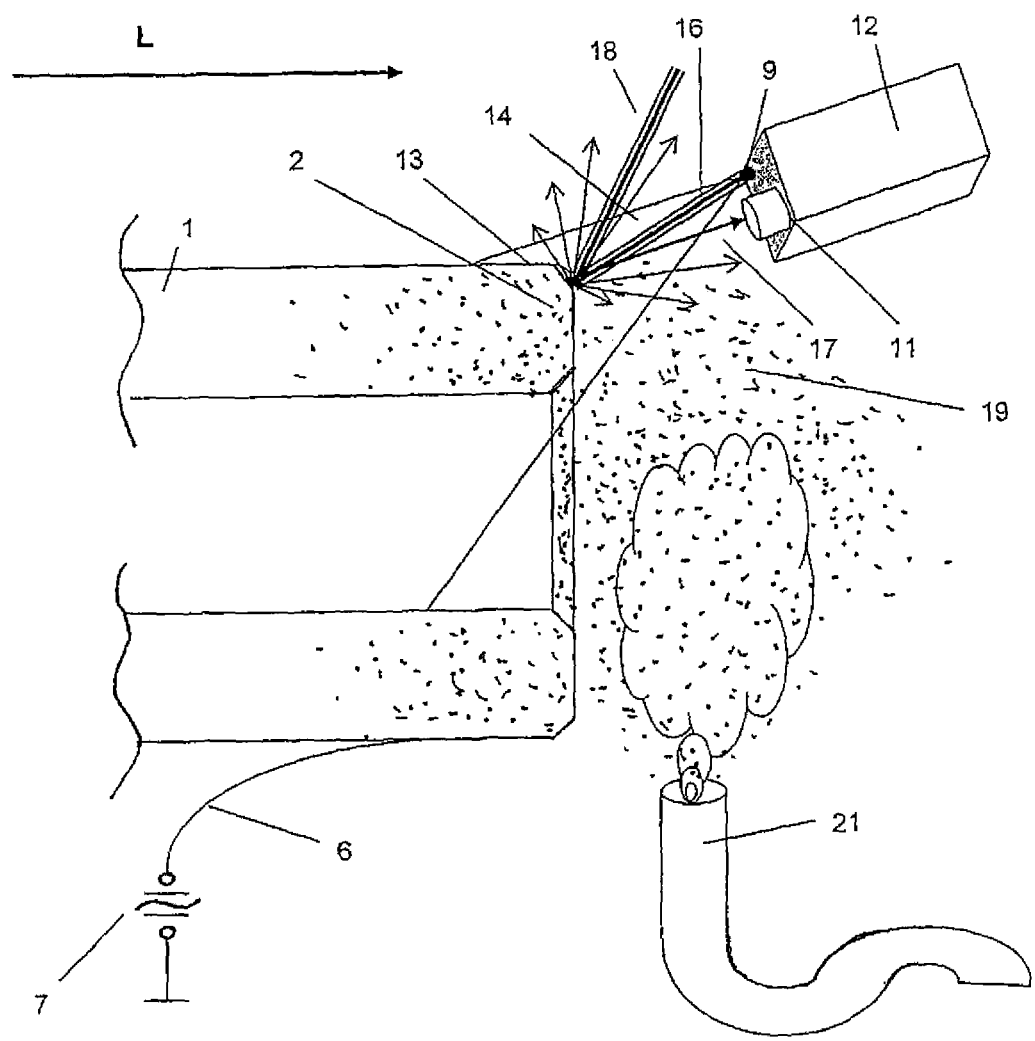

This is a National Phase application based on International Application Serial No. PCT/DE2009/000210 filed Feb. 16, 2009, which claims benefit of priority of German Patent Application No. 10 2008 009 757.8 filed Feb. 18, 2008.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

1. Field of the Invention

The invention relates to a method of measuring a profile of a reflecting face of a work piece, in particular a reflecting face of an end of a pipe section, and a measuring device for performing the method.

2. Background Art

Measurement stations and measuring methods for determining the profile of an end of a pipe section which has just been cut into lengths are known as constituent parts of integrated pipe-sawing plants for the performance of a final inspection, of the length, of the bevel angle etc. In the case of modern integrated pipe-sawing plants an integrated after-treatment of the pipe section cut into lengths is carried out in the form of de-burring, bevelling and washing of the pipe ends. In particular, for the subsequent inspection of the bevel angles, of the wall thickness and the internal and external diameters of the end of the pipe section cut into lengths, of the axial run-out and of the lateral run-out it is necessary in a high-precision machining of pipes for the pipe ends to be inspected individually after the procedure of cutting into lengths. Measurement stations for checking the above-mentioned parameters are known in principle in the prior art.

For example a measurement station for a pipe-cutting machine is known from DE 10 2005 043 223 A1, in which the named parameters of a pipe end cut into lengths are determined by means of two co-operating laser sensors.

In the measurement station described it has been found to be a drawback that immediately after cutting a metallic pipe section into lengths the machined metallic faces are highly shiny and thus reflect the incident laser beam—required for measurement—almost completely precisely at the emergent angle. There is thus relatively little scattered light which can fall on the sensor which is normally not arranged exactly at the emergent angle. The scattered light is required for the measurement in order to permit a comparison between the incident and the reflected laser beam.

BRIEF SUMMARY OF THE INVENTION

The object of the invention is therefore to improve a method of measuring the profile of a reflecting face of a work piece and a measuring device for performing the measuring method.

In the first aspect thereof the object is attained by a method with the features of claim 1.

According to the invention the face reflecting to a high degree is matt-finished in that suspended particles present in the ambient air are deposited on the reflecting face. The suspended particles may be dust particles which are present in any case in the ambient air, and also suspended particles additionally supplied by a supply device. Suspended particles may be additionally supplied in the form of smoke to the region of the reflecting face. In order that the suspended particles may be effectively deposited on the reflecting, shiny face, an electrical field is generated between the reflecting face and the particles suspended in the ambient air of the reflecting face.

It is preferable for the suspended particles to be charged electrostatically by means of an electrostatic filter or an electrostatic spray gun. As an alternative or in addition, the reflecting face can also be charged electrostatically.

The phenomenon that electrostatically charged faces attract dust particles surrounding them is known from everyday life. For example, the electrically charged television screen attracts dust or smooth glass tables charged by friction attract ambient dust.

The invention makes use of the fact that suspended particles for example in the form of dust particles which are present in any case are attracted in an effective manner to the reflecting face by the artificially generated electrostatic field, are deposited there and the face which is highly shiny per se becomes matt-finished in this way.

The reflecting faces can be machined faces of a work piece, for example the reflecting cut face—produced by a pipe-sawing machine—of the end of a pipe section which has just been cut into lengths from an elongate metallic pipe. Shortly after the pipe section has been sawn off from the elongate metallic pipe, the machined metallic faces are highly shiny and a laser beam striking them is reflected almost completely at the emergent angle. Scattered light occurs to only a slight degree. At least at first, therefore, a sufficiently effective and precise measurement is possible only to an inadequate degree by means of a sensor which is not tracked or fixed in position or relatively stable in position with respect to the laser and which is directed towards the scattered light. In principle, however, the method is suitable for measuring any reflecting faces.

According to the invention the reflecting, highly shiny face is covered with a quite thin layer of particles in fractions of a second by particles attracted by the electrostatic field and thus becomes matt-finished. The matt-finished face produces significantly more scattered light than the highly shiny face. The scattered light formed after the striking of the laser beam is also scattered into the sensor and permits a profile measurement by comparison of the laser beam emitted and scattered back.

No difference between the highly shiny face and the face covered with the thin layer of particles is visible to the naked eye.

In order that a sufficient number of suspended particles are constantly present in the ambient air of the reflecting face, a supply of suspended particles, for example in the form of a supply of smoke, can be provided. The supply of smoke can comprise an electrostatic spray gun.

The measurement method according to the invention is suitable in particular for the effective inspection of portions of a metallic pipe which have been cut into lengths. The method can be applied to various types of work pieces. After being cut into lengths the metallic pipe can undergo further machining steps, such as bevelling, washing, brushing etc. The pipe section, in particular metallic pipe section, which has been cut into lengths is then received in a receptacle of a measuring device according to the invention, is measured there by means of the measurement method according to the invention and is removed from the measuring device after measurement of its profile. If the measurement of the profile has resulted in measurement values in the tolerance range of pre-set nominal values, the work piece is loaded for further transportation, otherwise it is separated out.

In the cutting into lengths it is necessary for accuracies of 0.1 mm with a degree of probability of 99.99% to be observed. The measurement method according to the invention provided after the cutting into lengths is specified in order to ensure this degree of accuracy.

Metallic pipes usually oxidize automatically in the ambient air after being cut into lengths. The cut face of the metallic pipe also becomes matt-finished by this oxidation. In order to achieve an adequate matt-finishing, however, the oxidation procedure lasts at least 20 seconds. Only then can a sufficiently accurate measurement be carried out with conventional laser sensors. The method according to the invention, however, results in an adequately matt-finish face within fractions of a second, and in particular after less than 20 seconds.

As a result, the measurement method can be used with a significantly shorter clock time for checking pipe sections which have been cut into lengths.

In its second aspect the object is attained by a device for performing the method with the features of claim 8. The measuring device has a receptacle for a work piece with a reflecting face, the profile of which is to be determined. The work piece is preferably the machined end of a metallic pipe which has been cut into lengths. As described above, an electrical field is generated by a charging device between particles suspended in the ambient air in the region of the reflecting face received in the receptacle and the face itself.

An electrostatic spray gun is advantageously used for charging the suspended particles.

Adequate quantities of suspended particles, which ensure the short clock time mentioned above, can be supplied to the face by means of a suspended-particle supply means arranged on the receptacle.

BRIEF DESCRIPTION OF THE VIEW OF THE DRAWINGS

Figure 2:
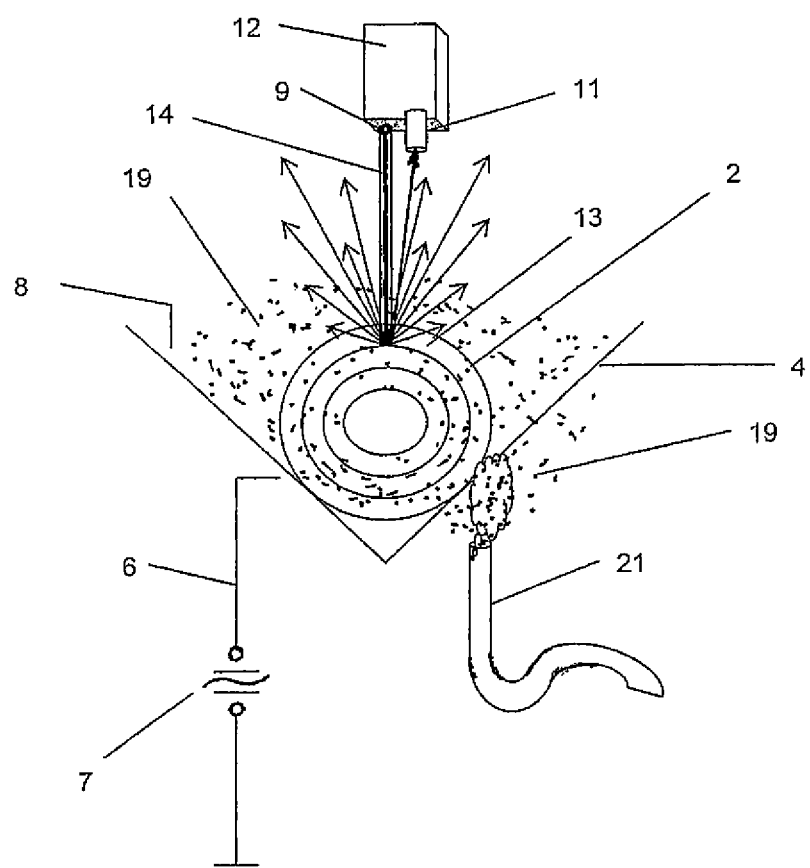

The invention is described with reference to an embodiment in two figures. In the figures FIG. 1 is a diagrammatic side view, partly as a section, of the measuring device according to the invention, and FIG. 2 is a diagrammatic front view of the measuring device as shown in FIG. 1.

DETAILED DESCRIPTION OF THE INVENTION

The measuring device according to the invention is part of an integrated pipe-sawing plant. In an integrated pipe-sawing plant individual pipe sections are first cut into lengths from an elongate metallic pipe in a clock-timed manner. After the cutting into lengths the pipe sections 1 are, in the following steps, bevelled, brushed and washed. The completely machined pipe section 1 must finally be inspected, in order to be able to meet the high precision requirements concerning the pre-determined length, the bevel angle, the wall thickness etc. For example, the length of a pipe section 1 has to be cut into lengths with an accuracy of 0.1 mm with a degree of probability of 99.99% in order to meet the usual delivery commitments. The measuring device according to the invention, illustrated in FIG. 1 and FIG. 2 is used for the inspection of the machined ends 2 of the pipe sections.

The measuring device has a receptacle 4 for the machined pipe sections 1 which have been cut into lengths, it being possible for the receptacle 4 to be charged with the individual ends 2 of the pipe sections in a clock-timed manner by means of a gripping arm (not shown). In the embodiment described here the ends 2 of metallic pipes are measured and inspected.

An electrical contact 6, which is connected at one end to an electrical charging source 7 and is connected in a conductive manner at the other end to the pipe section 1 inserted in the receptacle 4, is arranged on the receptacle 4. As shown in FIG. 2 the receptacle 4 is moulded in a conical manner in a cross-section at a right angle to the longitudinal direction L of the pipe section 1 cut into lengths and it is coated on its inside with a metallic lining 8. The metallic lining 8 is connected in a conductive manner to the electrical contact 6 and it charges the metallic lining 8. The pipe section 1 inserted in the receptacle 4 automatically comes into contact with the metallic lining 8 when the receptacle 4 is loaded, and the metallic pipe section 1 is charged electrically by the contact itself.

FIG. 1 is a diagrammatic view of the end 2 of the pipe section already charged by way of the electrical charging source 7.

A laser sensor 12 with an integrated laser 9 and with an integrated sensor 11 is provided substantially opposite the pipe section 1 inserted in the receptacle 4. The laser 9 and the sensor 11 are at a constant relative position with respect to each other.

The laser sensor 12 emits a laser fan 14, the plane of which extends substantially parallel to the longitudinal direction L of the pipe section 1 cut into lengths. In order to form the fan 14 a bundled laser beam 16 is rapidly oscillated or the laser beam 16 is fanned out by means of an optical device likewise incorporated in the laser sensor 12.

The integrated sensor 11 comprises a CCD camera. The profile of the end 2 of the pipe section is determined by the line profile 13 being determined along some lines in the longitudinal direction L of the ends 2 of the pipe section, and the profile of the end 2 of the pipe section is calculated from the individual line profiles 13.

In order to determine the individual line profiles 13, the end 2 of the pipe section is sensed along a line with the laser fan 14, and from the sensed points of the face of the end 2 of the pipe section scattered light 17 of the laser fan 14 reflected by them is recorded by the sensor 11. The line profile 13 is determined along a line in the longitudinal direction L by determination of the path difference between the incident laser beam 16 of the laser fan 14 striking the sensed point and the scattered beam 17. What is necessary for determining the line profile 13 is that scattered light 17 is reflected in the direction of the sensor 11 from the sensed point of the end 2 of the pipe section. For a short time after the pipe section 1 is cut into lengths and machined the ends 2 of the pipe sections are extremely shiny, i.e. the surfaces of the ends 2 of the pipe section reflect the incident laser beam 16 completely into the reflected laser beam 18, from the incident angle into the emergent angle. Scattered light 17 is practically not present, or at least in such a slight degree that a rapid but nevertheless sufficiently precise measurement of the lengths can be carried out.

The reflecting face automatically becomes matt-finished after about 20 seconds by oxidation of the machined ends 2 of the pipe sections to the extent that an adequate degree of matt-finishing is then present, so that sufficient scattered light 17 occurs after the incident laser beam 16 of the laser fan 14 strikes, which can be detected by the sensor 11.

The difference between the shining face and the face matt-finished by oxidation is not visible to the naked eye. In order to shorten the time span pre-set by oxidation on its own from about 20 seconds, the ends 2 of the pipe sections are electrically charged. Suspended particles 19 suspended in the air in the region around the end 2 of the pipe section are immediately attracted by the electrical charge. The suspended particles 19 are attracted by the electrostatic field formed between the suspended particles 19 and the end 2 of the pipe section, they are also deposited on the shiny surface of the end 2 of the pipe section and they immediately matt-finish this surface. This matt-finishing which results from the deposition of the particles 19 suspended in the environment is sufficient to produce enough scattered light 17 for a measurement of the lengths by means of the laser 9 and the sensor 11 to become possible immediately.

The measurement of a pipe section 1 including insertion of the pipe section 1 in the receptacle 4 and removal of the measured pipe section 1 from the receptacle lasts about 2 seconds.

A suspended-particle supply means 21 is arranged as part of the measuring device in the region of the ends 2 of the pipe sections inserted in the receptacle 4. In this case the suspended-particle supply means 21 is designed in the form of a smoke supply means. The dust particles, suspended particles and other particles present in the smoke are blown into the region of the ends 2 of the pipe sections, and they thus make available the quantities of suspended particles 19 which become necessary for the measurements carried out in the short clock timing.

The quantity of the suspended particles 21 supplied per measurement is controlled electronically. To this end the region of the receptacle 4 can have provided in it a smoke-particle detector (not indicated) which determines the suspended particles 19 present in the air space of the receptacle 4 and the quantity of the suspended particles 19 is controlled in a narrowly fluctuating manner by a pre-set nominal value by way of the control device.

The measured pipe section 1 is removed with suspended particles 19 deposited thereon from the receptacle 4 by means of the support arm, and, in the event that the pipe section 1 is found to have been cut into lengths sufficiently accurately, is loaded for further transport and otherwise is separated out. The pipe sections 1 are unloaded by the further conveying of the pipe sections 1 and the transportation without further action, and the dust particles 19 spontaneously drop off again.

List Of References 1 pipe section
2 end of pipe section
4 receptacle
5 —
6 electrical contact
7 electrical charging source
8 metallic coating
9 laser
10 —
11 sensor
12 laser sensor
13 line profile
14 laser fan
15 —
16 incident laser beam
17 scattered light
18 reflected laser beam
19 suspended particles
20 —
21 suspended-particle supply means
L longitudinal direction

The invention claimed is:

1. A method of measuring a profile of a reflecting face of an end (2) of a metallic pipe section, in that inserting a pipe section (1) in a receptacle (4) of a measuring device which is coated at its inside with a metallic lining (8) the inserted pipe section (1) is getting automatically into contact with while loading the receptacle (4) and in that charging the metallic lining (8) electrically by an electrical contact (6) connected to it and charging the end (2) of the pipe section in that an electrical field is generated between the face and suspended particles (19) suspending in the ambient air of the face, the particles (19) being attracted to the face and matt-finishing the face by depositing thereon and afterwards the matt-finished face is sensed with a laser beam (16) and scattered light (17) reflected by the matt-finished face is measured by a sensor (11) and in this way the profile of the face is determined and removing the pipe section (1) from the measuring device after the measuring of the profile and discharges and the suspended particles (19) spontaneously drop off again.

2. A measurement method according to claim 1, characterized in that the particles (19) are charged electrostatically.

3. A measurement method according to claim 1, characterized in that the face is charged electrostatically.

4. A measurement method according to claim 1, characterized in that suspended particles (19) are supplied to the environment in the region of the face by way of particle-supply means (21).

5. A measurement method according to claim 1, characterized in that the pipe section is received in a measuring device and is removed from the measuring device after the profile has been measured.

6. A measurement method according to claim 5, characterized in that the pipe section is cut into lengths from a profiled material and is then received in the measuring device.

7. A measurement method according to claim 6, characterized in that the pipe section is measured less than 20 seconds after being cut into lengths.

8. A measuring device for performing a method according to claim 1, with suspended particles (19) and with a receptacle (4) for a pipe section (1) with a reflecting face, the profile of which is to be determined, whereby the receptacle (4) is plated at its internal side with a metallic cover (8) which the inserted pipe section (1) is getting automatically into contact with while loading the receptacle (4) and whereby the metallic cover (8) is connected with one end of an electrical contact (6) the other end of which is connected electrically to a charging device (7) so that the end of the pipe section (2) is capable of being charged, and by which an electrical field is capable of being generated between the face and suspended particles (19) suspending in the ambient air of the face, whereby the particles (19) being attracted to the face, being deposited there and matt-finishing the face, and with a laser (9) with a laser beam (16) sensing the matt-finished surface and with a sensor (11) measuring scattered light (17) reflected by the matt-finished face, characterized in that the suspended particles (19) are provided in such a manner that they drop off by themselves from the end of the pipe section (2) after the pipe section (1) is removed and discharged after the measuring of the profile.

9. A measuring device according to claim 8, characterized by an electrical contact (6) which is arranged at the receptacle (4) and which automatically comes into contact with the work piece received.

10. A measuring device according to claim 9, characterized by a particle-supply device (21).

11. A measuring device according to claim 10, characterized in that the charging device (7) is provided on the particle-supply device (21).

* * * * *